Nov. 9, 1965  W. C. NEWLIN ETAL  3,216,741
BASE ENCLOSURE FOR TRAILERS
Filed Jan. 15, 1964  2 Sheets-Sheet 1
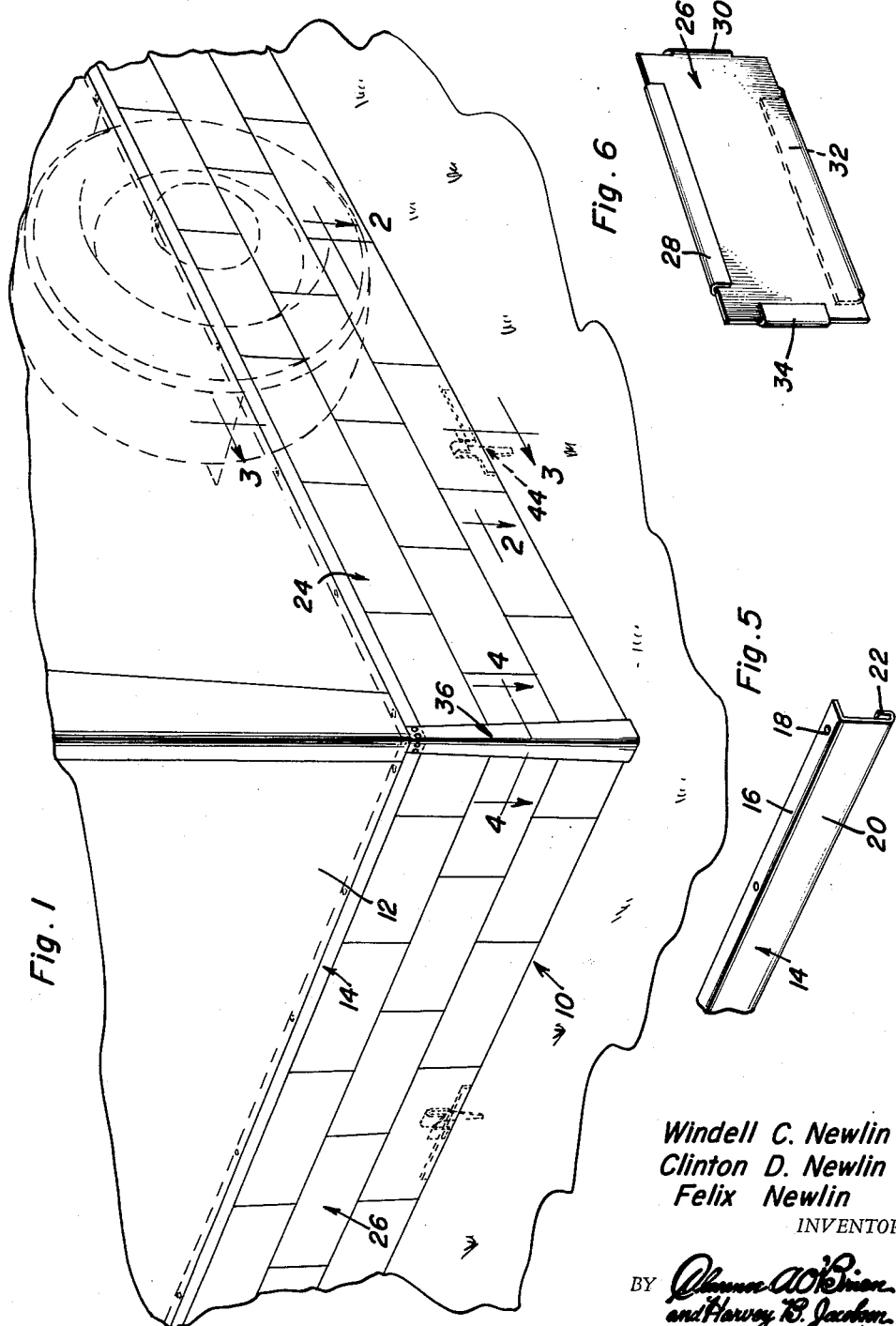
Windell C. Newlin
Clinton D. Newlin
Felix Newlin
INVENTORS

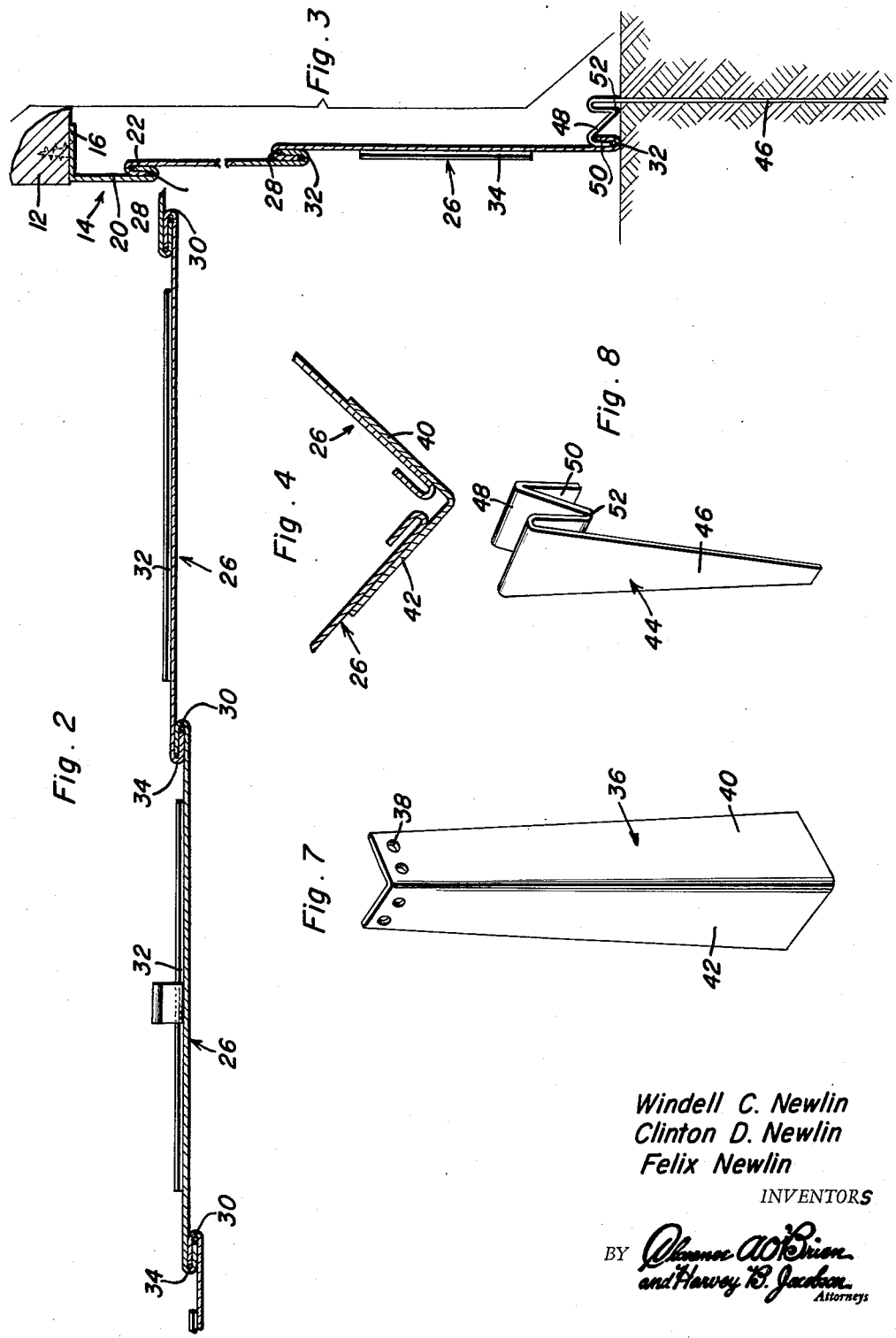

United States Patent Office 3,216,741
Patented Nov. 9, 1965

3,216,741
BASE ENCLOSURE FOR TRAILERS
Windell C. Newlin, Clinton D. Newlin, and Felix Newlin,
all of 202 E. Avenue F, Killeen, Tex.
Filed Jan. 15, 1964, Ser. No. 337,927
4 Claims. (Cl. 280—150)

This invention primarily relates to a base enclosure depending from the bottom of a house trailer body for enclosing the space beneath the house trailer.

It is the primary object of this invention to disclose a base enclosure depending from the bottom of a house trailer and extending about the periphery thereof wherein the space enclosed may be used as a storage area and the appearance of the trailer may be enhanced when it is used as permanent living quarters of a substantial period of time.

Another object of the present invention is to disclose a base enclosure for a trailer as previously described which comprises a plurality of easily installed interlocking panels defining a plurality of wall structures which may be quickly and easily installed and removed from the periphery of the trailer body.

A still further object of this invention is to provide a base enclosure for a trailer body including novel means for firmly anchoring the enclosure to the ground surface on which the trailer body is disposed.

Yet another object of this invention resides in the fact that the enclosure comprises four basic building elements, one of which may be permanently installed upon the trailer bottom, the other of which are easily removed and attached to the permanent installation by the use of interlocking flanges on all the elements. Such an arrangement readily adapts itself to an ease of maintenance and quick installation by the unskilled artisan.

A still further object of this invention resides in the fact that the base enclosure provides an effective sealing means against all kinds of weather elements thereby adapting the trailer for habitation during the cold winter months.

Another object of this invention resides in the fact that the enclosure may be constructed of portable elements which may be readily fabricated by the ordinary means of commercial production.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the base enclosure comprising the subject matter of the instant invention shown mounted about the periphery of the bottom of a trailer body.

FIGURE 2 is a fragmentary cross sectional view taken substantially along the plane indicated by the line 2—2 of FIGURE 1.

FIGURE 3 is a fragmentary cross sectional view taken substantially along the plane indicated by the line 3—3 of FIGURE 1, and further illustrates the novel interlocking engagement of the building elements of the enclosure.

FIGURE 4 is a cross sectional view taken substantially along the plane indicated by the line 4—4 of FIGURE 1 and illustrating a typical corner joint of the base enclosure.

FIGURE 5 is a fragmentary perspective view of a bracket strip which may be permanently installed on the bottom of the trailer body for mounting a plurality of building panels which form the base enclosure.

FIGURE 6 is a perspective view of an individual building panel used in the construction of the base enclosure.

FIGURE 7 is a perspective view of a corner building element used to join adjacent corners of the building panels of adjacent walls formed from said panels.

FIGURE 8 is a perspective view of the novel anchor used in conjunction with the base enclosure of the present invention for anchoring the base enclosure to the ground surface of which the trailer body is disposed.

Referring now to the drawings in detail, the base enclosure generally designated by the numeral 10 is adapted to be mounted upon a conventional house trailer body 12. The base enclosure 10 comprises a plurality of elongated bracket strips such as 14 comprising a horizontal flange 16 having a plurality of spaced fastener receiving apertures 18 along the length thereof. As shown most clearly in FIGURE 3, the horizontal flange 16 is adapted to the attached to the bottom surface of the trailer body about the periphery thereof. Each of the bracket strips 14 further comprise a vertical leg 20 terminating in a reversely bent flange 22.

Each wall 24 of the base enclosure 10 is fabricated from a plurality of individual interlocked panels generally designated by the numeral 26. Each of the interlocked panels 26 is substantially rectangular and includes reversely bent flanges 28, 30, 32 and 34 joined to the edges thereof. It should be noted that the opposite reversely bent flanges 28 and 32 and 30 and 34 on said panels are reversely bent in opposite directions. The adjacent flanges on adjacent panels 26 are interlocked as shown most clearly in FIGURES 2 and 3 to define each one of the wall structures 24 for the base enclosure 10. That is, the flanges 30, 34 on adjacent panels are interlocked as well as the flanges 32 and 28. Due to the opposite flanges on said panels being reversely bent in opposite directions, the joints between adjacent panels are concealed.

The reversely bent flanges 28 on the uppermost panels in said wall structures 24 are placed in interlocking engagement with the reversely bent flanges 22 on the bracket strips 14 as clearly shown in FIGURE 3. In this manner, the panels 25 are conveniently and easily attached to the bottom of the trailer body. In order to stabilize the base enclosure 10 and to dress the adjacent corners of the wall structures 24, and L-shaped sleeve such as 36 including a plurality of apertures 38 adjacent one edge thereof is secured to adjacent bracket strips 14 at a corner juncture thereof. This is shown more clearly in FIGURES 1 and 4 wherein fasteners may be disposed through the apertures 38 securing the L-shaped sleeve 36 to the corner juncture of the bracket strips 14. The right angle legs 40 and 42 are adapted to abut the adjacent corner panels 26 on a pair of adjacent walls 24. The sleeve 36 conceals the juncture of the walls and substantially completes the enclosure to prevent the elements from penetrating into the enclosure.

An anchor such as 44 is adapted to secure the interlocked panels 26 and the base enclosure 10 to the ground surface on which the trailer body is disposed. The anchor 44 is formed of sheet material and comprises an elongated spike 46 and a substntially V-shaped portion 48 joined to the spike 46. A flange 50 of the V-shaped portion 48 of the anchor 44 is adapted to be interlocked with the reversely bent flanges 32 on some of the lowermost panels of the wall structures as more clearly shown in FIGURES 1 and 3. The spike portion 46 is adapted to be driven into the ground and the wall structures will thus be secured to the ground. Due to the Z-shaped configuration of the portion 48, a stop defined by the apex 52 limits the earth penetrating depth of the spike 46. Since the lower edge of the flange 50 and the apex 52 are disposed in the same plane, when the apex 52 abuts the ground surface, the flange 50 will be completely seated in the reversely bent flanges 32 on the panels 26 and since further earth penetration of the spike 46 is prevented, there will be no distortion of the panels 26 or the anchors 44. The apices 52 of the anchors 44 also provide another line of support to substantially preclude rocking movement of the panels 26 due to wind forces and the like.

It should also be apparent that by deleting certain panels 26 in each of the wall structures 24, a door may be built or provided for access beneath the trailer body through the base enclosure. Conventional hinges, screws, catches and knobs may be used to hang the door on adjacent panels 26.

Summarizing, it should be apparent that the base enclosure may be quickly and easily removed and installed by an unskilled artisan. The elongated bracket strips 14 may be permanently secured to the bottom of the trailer body 12. When it is desired to install the base enclosure 10, all that is necessary is to interlock a plurality of stored panels 26 to form each of the wall structures 24. The uppermost reversely bent flanges 28 in the wall structure may then be interlocked easily and quickly with the reversely bent flanges 22 of the terminal portion of the leg 20 of the bracket strips 14. The sleeves 36 may then be attached to stabilize the wall structures and the anchors 44 may quickly be driven into the earth to secure the bottoms of the walls 24 to the ground.

The foregoing is considered as illustrative only of the principles of the invention. Further, since numerous modifications and changes will readily occur to those skilled in the art, it is not desired to limit the invention to the exact construction and operation shown and described, and acordingly all suitable modifications and equivalents may be resorted to, falling within the scope of the invention as claimed.

What is claimed as new is as follows:

1. For use with a trailer body, an enclosure depending from the bottom of the trailer body comprising elongated bracket strips adapted to be secured about the periphery of the trailer bottom, said strips incluring a vertical leg terminating in a reversely bent flange, a plurality of interlocked panels defining a plurality of wall structures, each one of which has a reversely bent flange along one edge thereof received in interlocking engagement with the reversely bent flange on one of the bracket strips, means for anchoring said interlock panels to the ground surface on which the trailer body is disposed, each of said panels being substantially rectangular and including a reversely bent flange joined to each edge thereof, opposite flanges opening along respectively opposite faces of said panels, adjacent flanges on adjacent panels being interlocked to define said wall structures and the uppermost panels in said wall structures each having a reversely bent flange interlocked with the reversely bent flange on said bracket strips, said anchoring means including a spike formed of sheet material having a portion of Z-shaped configuration at one end thereof, the lowermost reversely bent flanges on some of the lowermost panels of said wall structures receiving a flange of said Z-shaped portion of one of said spikes in interlocking engagement, the end of said spike remote from said Z-shaped portion being driven into said ground surface.

2. The enclosure of claim 1 including means secured to and depending from said bracket strips for completing the enclosure by joining adjacent corners of said wall structures.

3. The enclosure of claim 2 wherein said completing means comprises sleeve means secured to and depending from said bracket strips at the corners of said trailer body, said sleeve means completing the enclosure by joining adjacent corners of said wall structures.

4. The enclosure of claim 3 wherein said sleeve means comprises an elongated member including a pair of legs positioned at substantially right angles to each other.

References Cited by the Examiner
UNITED STATES PATENTS

| | | | |
|---|---|---|---|
| 2,618,493 | 11/52 | Fransen | 280—150 |
| 2,830,546 | 4/58 | Rippe | 50—229 X |
| 2,961,255 | 11/60 | Trott | 280—150 |
| 2,988,380 | 6/61 | Puckett | 280—150 |
| 3,042,425 | 7/62 | Cathey | 280—150 |
| 3,106,411 | 10/63 | Holmes | 280—150 |
| 3,113,357 | 12/63 | Reukauf | 280—150 |

BENJAMIN HERSH, *Primary Examiner.*

LEO FRIAGLIA, *Examiner.*